(12) United States Patent
Maddison et al.

(10) Patent No.: US 8,295,563 B2
(45) Date of Patent: Oct. 23, 2012

(54) METHOD AND APPARATUS FOR ALIGNING MICROSCOPE IMAGES

(75) Inventors: John Maddison, Crowborough (GB); Havard E. Danielsen, Tofte (NO)

(73) Assignee: Room 4 Group, Ltd., Crowborough, East Sussex (GB)

( * ) Notice: Subject to any disclaimer, the term of this patent is extended or adjusted under 35 U.S.C. 154(b) by 1169 days.

(21) Appl. No.: 11/698,196

(22) Filed: Jan. 26, 2007

(65) Prior Publication Data

US 2007/0230755 A1 Oct. 4, 2007

(30) Foreign Application Priority Data

Jan. 26, 2006 (GB) .................................. 0601509.3

(51) Int. Cl.
*G06K 9/00* (2006.01)
(52) U.S. Cl. ........................................ 382/128; 382/284
(58) Field of Classification Search ................... 382/128
See application file for complete search history.

(56) References Cited

U.S. PATENT DOCUMENTS

| | | | |
|---|---|---|---|
| 4,202,037 A | 5/1980 | Glaser et al. | |
| 5,768,443 A * | 6/1998 | Michael et al. | ............... 382/294 |
| 5,841,148 A * | 11/1998 | Some et al. | ................... 250/584 |
| 2002/0028471 A1* | 3/2002 | Oberhardt | .................... 435/7.21 |
| 2004/0109231 A1 | 6/2004 | Haisch et al. | |
| 2005/0084175 A1* | 4/2005 | Olszak | .......................... 382/284 |
| 2006/0045388 A1 | 3/2006 | Zeineh et al. | |

FOREIGN PATENT DOCUMENTS

| | | |
|---|---|---|
| EP | 1598688 | 11/2005 |
| EP | 1775618 | 4/2007 |
| GB | 2383487 | 6/2003 |

* cited by examiner

*Primary Examiner* — Hadi Akhavannik
(74) *Attorney, Agent, or Firm* — Dowell & Dowell, P.C.

(57) ABSTRACT

A method and apparatus for aligning microscope images. Microscope images of the same or very similar subjects provided by different microscopes are aligned. The images from two types of microscope, such as a Virtual Microscope (VM) and a Light Microscope (LM) are used. An image produced by the virtual microscope is easily read by a viewer, as it represents a scan of a whole slide rather than individual high power fields of view. An area of the image can be selected for further examination or objective analysis by the LM microscope. The qualitative or quantitative information obtained from the Light microscope using the method described may then be located back into the virtual microscope image to provide understandable context.

18 Claims, 13 Drawing Sheets

(13 of 13 Drawing Sheet(s) Filed in Color)

Figure 21

METHOD AND APPARATUS FOR ALIGNING MICROSCOPE IMAGES

BACKGROUND TO THE INVENTION

The present invention relates to a method and apparatus for aligning microscope images. The preferred arrangement of the invention relates to an arrangement in which microscope images of the same or very similar subjects provided by different microscopes or the same microscope at different magnifications are to be aligned.

For example, microscope images of the same (or very similar) subject but at different powers, or different types of microscope image, for example, the same or similar microscope images stained with different types of stain, need to be compared and to compare the two images it is necessary to be able to align the two images or at least the parts of the image under examination.

In examining biological specimens, it is well known that there are problems. The microscope slide of a biological specimen may be examined for the tissue structure which is particularly useful for a pathologist, using H and E staining (see http://en.wikipedia.org/w/index.php?title=H%26E_stain&printable=yes.) The stain stains the tissue structures which means that it is possible to pick out anomalies in the structure.

To examine the cellular structure or other quantitative information in more detail, a stain such as the Feulgen stain is preferred: (see http://www.k-state.edu/wgrc/Protocols/Cytogenetics/feulgen.html.) In Feulgen staining, the DNA of cells are selectively stained which enables one to more readily examine the cell structure. On the other hand the tissue structure is less easily determined. It is desirable, therefore, to be able to view a particular section of biological tissue using both techniques. Other stains may be used for different purposes such as stains incorporating biomarkers which may be used to identify areas of specific biological interest or event.

Furthermore, more information can be determined from these techniques by looking into the cellular structure using the Feulgen staining and using a higher powered microscope than would normally be used, that is an oil-immersion, lens microscope (LM).

The difficulty is that it is necessary for an observer such as a pathologist to be able to provide a correlation between the structure which is easily viewed with the H and E stain slide, with the detailed structure and/or quantatative information provided by the oil-immersion microscope and Feulgen stain. In other words, the pathologist would benefit from knowing exactly which cell, group of cells or area in the H and E stain image corresponds to the detailed cellular structure of the Feulgen stained image from the LM microscope which is also at a higher magnification.

SUMMARY OF THE INVETION

According to a first aspect, the present invention provides a method for aligning microscope images comprising
providing a first image of a subject using a first microscope,
providing a second image of said subject using a second microscope, and
aligning the two images.

The two images are preferably aligned by cross correlation.

One microscope image may be provided by using a Virtual microscope scanner.

Preferably the second image comprises an image of a selected part of the first image.

Aligning the two images produces a third image wherein first and second images are superimposed in alignment.

The first and second images may show different features of the subject, and where the subject is biological tissue, the different features comprise the tissue structure and the cellular structure. In that case, the first and second images may be stained with different stains.

The first microscope may provide an image at a relatively low magnification and large areas of the subject are examined, and the second microscope may provide an image is at higher magnification, and a part of the first image is selected for examination by the second microscope under higher magnification.

The first and second images may be aligned by selecting a plurality of point on the first and second images and carrying out an affine transformation.

The first and second images may be aligned by
  selecting a part of the first image and successively comparing it with a similarly shaped and sized parts of the second image translationally and/or rotationally spaced from the first part and from each other, and
determining the parts of the first and second images providing the closest cross correlation to thereby align the first and second images.

The first and second images may be processed to provide similar contrast and/or colours for easier comparison.

According to a second aspect, the present invention provides apparatus for aligning microscope images comprising
a first microscope for providing a first image of a subject,
a second microscope for providing a second image of said subject and computer processing apparatus for aligning the two images.

Preferably the computer processing apparatus includes means to align the two images by cross correlation.

Preferably the computer processing apparatus includes means to successively compare a part of the first image with similarly shaped and sized parts of the second image translationally and/or rotationally spaced from the first part and from each other, and
means for determining the parts of the first and second images providing the closest cross correlation to thereby align the first and second images.

In an arrangement to be described, the images from two types of microscope, that is, a virtual microscope (VM) and a bright field microscope with an oil-immersion lens, Light Microscope (LM) are used. An image produced by the virtual microscope is easily read by a viewer, as it represents a scan of a whole slide rather than individual high power fields of view. An area of the image can be selected for further examination or objective analysis by the LM microscope where the optical configuration of this device allows for greater resolution and advanced imaging possibilities.

It is necessary, of course, for the images produced by the VM microscope and the LM microscope to be aligned so that the operator or analysis system (usually a computer analysis system) is comparing different views of the same part of the subject. A two-step procedure will be described in which the first step will be to take an image of the subject using the VM microscope; the image may be made available to an interested party such as pathologist who can select a portion of interest; the second step comprises viewing that portion a second time with the LM microscope, thereby providing greater resolution of that portion or more accurate quantitative information.

To align the images from the two microscopes, a reference part of one of the images is compared with the other image by a cross-correlation technique.

BRIEF DESCRIPTION OF THE DRAWINGS

The patent of application file contains at least one drawing executed in color. Copies of this patent or application publication with color drawing(s) will be provided by the office upon request and payment of the necessary fee.

A preferred arrangement of the invention will now be described by way of example only with reference to the accompanying drawings in which.

DESCRIPTION OF PREFERRED EMBODIMENTS OF THE INVENTION

Figure 1:
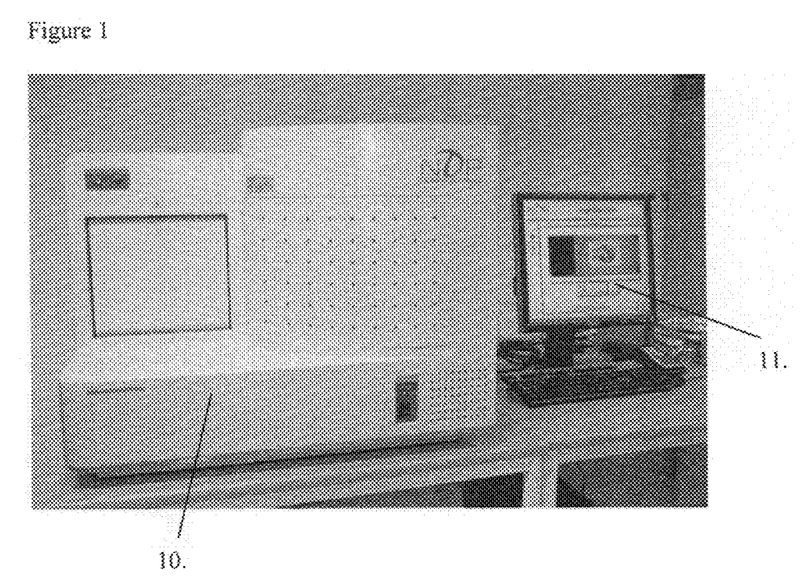
FIG. 1 shows one such so-called virtual microscope (VM Microscope) sold under the name "Nanozoomer" (Hamamatsu Photonics, Japan), (http://www.nanozoomer.co.uk/)

Referring to FIG. 1, there is shown a VM microscope 10 which comprises microscope optical components, a stage for mounting a specimen to be examined, a CCD (charge coupled device) array or other electronic imaging device for receiving the image of the specimen, a memory for storing the image, a computer for processing the image and a VDU 11 for displaying the image and other data. A prepared slide of, normally, a slice of biological tissue is scanned by the VM microscope to produce an image of the type shown in FIG. 2. For each point on the image on the CCD, the CCD array includes a red, green and blue wavelength detector providing red, green and blue signals. The operation of such a virtual microscope 10 is well known in the art.

Figure 2:
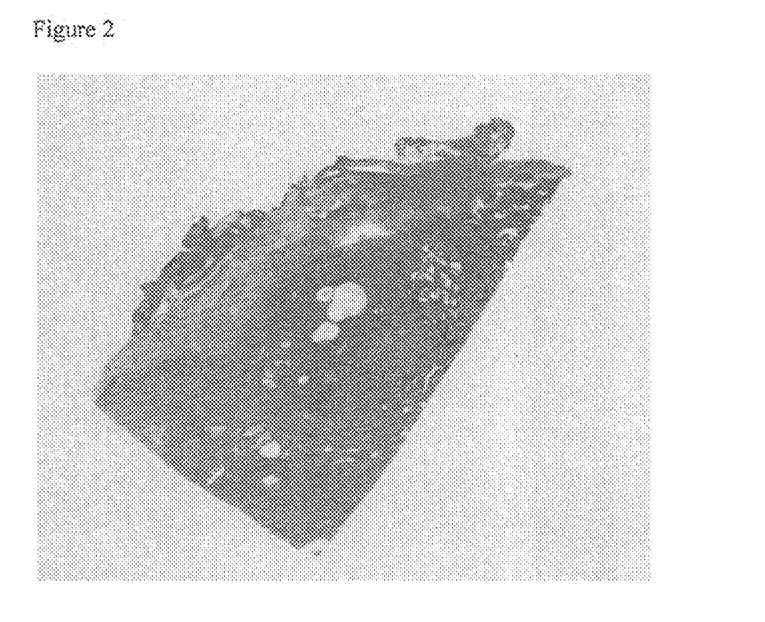
FIG. 2 shows an image of an object in the form of a slice of biological tissue on a microscope slide taken by the virtual microscope of FIG. 1.

The image shown in FIG. 2 is of biological tissue which has been stained with a conventional H and E stain. This stain highlights the structure of the cellular material in the biological specimen.

Figure 4:
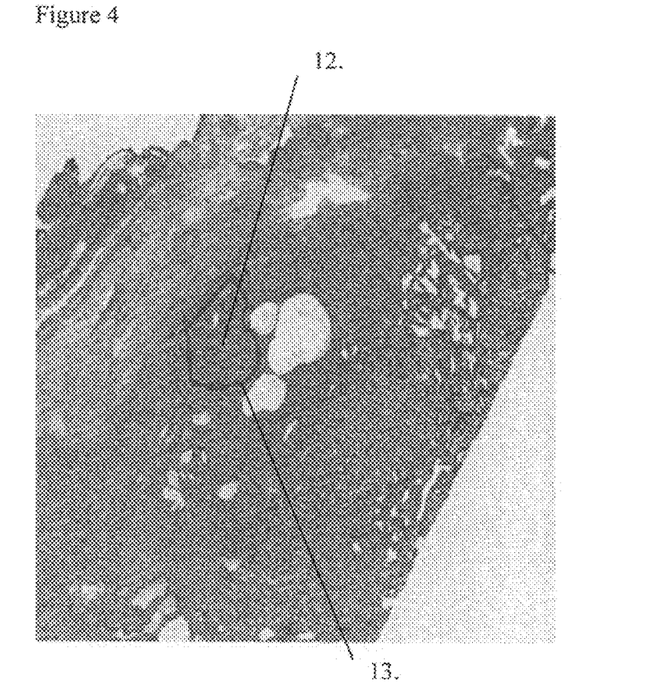
FIG. 4 is an enlarged portion of the image of FIG. 2 with an area of interest outlined by a user.

In use, such an image may be examined on a computer screen and an area 12 of particular interest (ROI) e.g a tumour area, may be highlighted as is shown delineated by a closed line 13 in FIG. 4.

The maximum magnification provided by the VM microscope corresponds for example, to approximately a 40× objective optical microscope lens when used on a standard bright field microscope.

Figure 3:
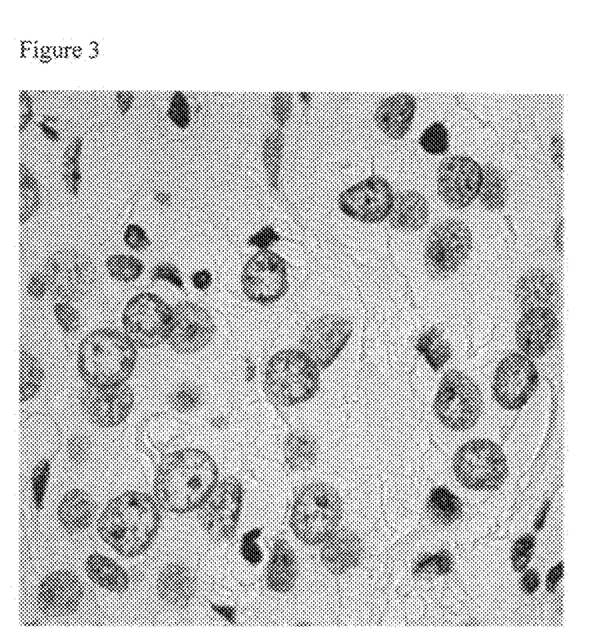
FIG. 3 shows a typical highly magnified image of the object from a high power light microscope (LM) with an oil-immersion lens, (http://en.wikipedia.org/wiki/Light_microscope)

Clearly it is desirable to try to obtain greater resolution, and so far as an optical image is concerned, this may be provided by the use of a light microscope (LM). FIG. 3 shows an image captured by an LM microscope using a 63× oil-immersion lens and a high quality digital camera attached to the optics of the microscope. In the case of such a LM microscope system, the magnification may be equivalent to a 80× magnification of the VM system because of the increased resolution of the digital camera used on the LM systems as well as the increased objective magnification.

Figure 20:
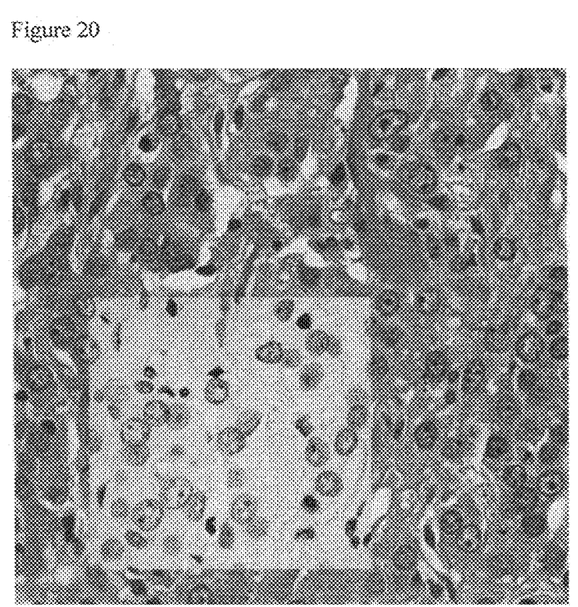
FIG. 20 shows a composite image comprising the aligned VM H and E stained image and the LM image.
Figure 21:
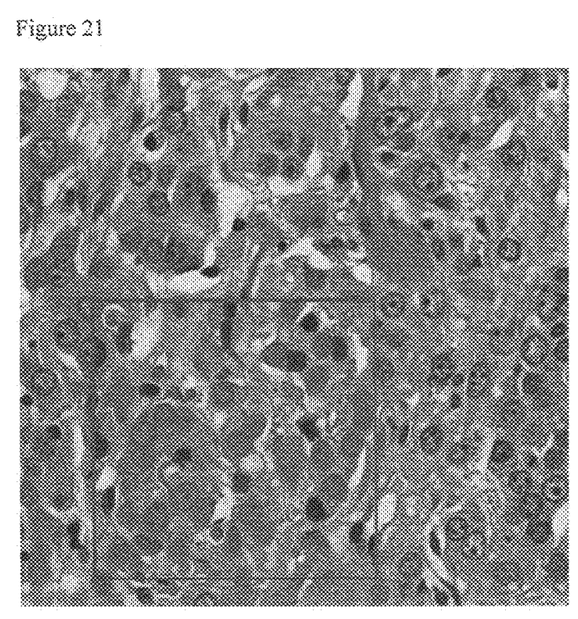
FIG. 21 shows an example overlay where the area of the cell nuclei has been calculated from the Feulgen LM image and the results overlaid in the H&E scanned VM image.

A disadvantage of the use of an LM microscope can be the large number of images produced from a single slide because of its greater magnification (too many to be readily stored) and also the LM microscope only has a small field of view. In order to utilize effectively the greater magnification available with the LM microscope it is desirable to be able to use a single image of the whole of the relevant slide using the VM microscope of FIG. 1, that is the image of FIG. 2, and for the user, for example, a pathologist, to select a particular part of the image of FIG. 2 (e.g. the area 12) and to be supplied with the corresponding image of the selected part from the LM microscope. Even more desirable is to provide an image of an enlarged VM image with the LM image super-imposed (as shown in FIG. 20) or quantitative information overlaid (such as analysis of the sizes of the cells as shown in FIG. 21).

In accordance with the method, and starting with the areas selected in FIG. 4, under computer control, the LM microscope selects a grid of points 16, hereafter referred to as fields of view ("FOV"), over the area 12 selected by the pathologist. Time can be saved in subsequent image analysis steps by decreasing the number of fields to be measured by sampling a proportion, of for example 30% but depending on the nature of the tissue, of the image in the selected region of interest.

Figure 5:
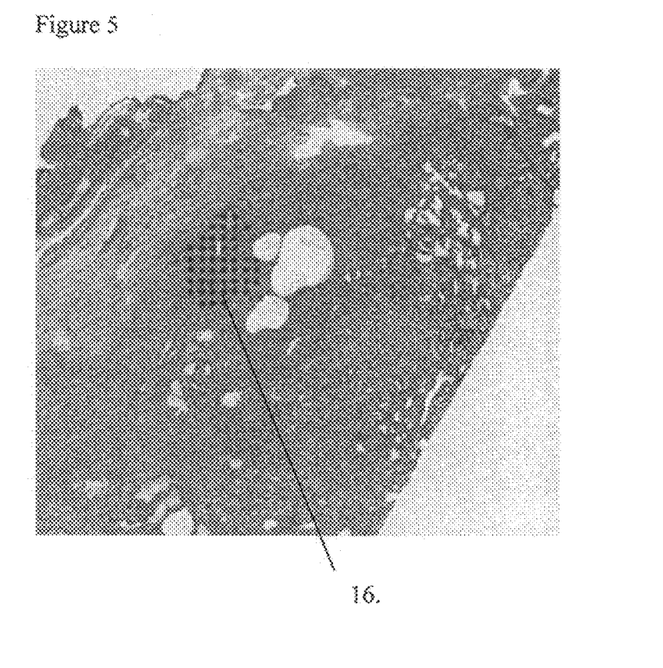
FIG. 5 is the image of FIG. 4 but illustrating a grid of "points" which are to be viewed with both the VM and LM microscope and captured by the LM microscope for further analysis.
Figure 9:
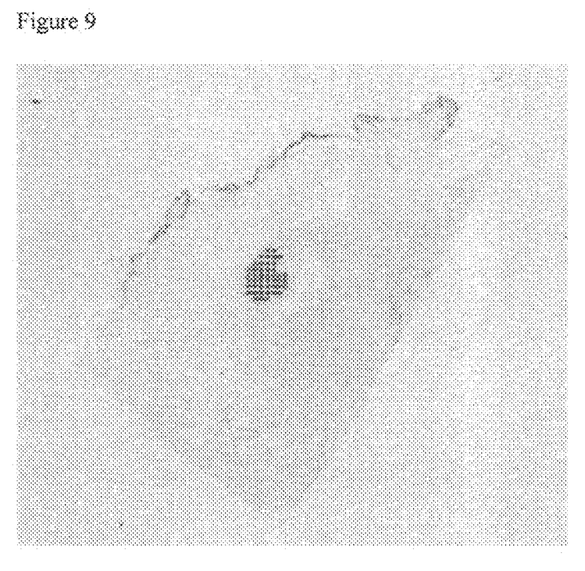

FIG. 4 shows a view similar to FIG. 5. After the FOV 16 are sampled by the LM microscope, the relevant biological sample is de-stained to remove the H and E stain and is then Feulgen stained. The image of this sample is shown in FIG. 9. (FIG. 9 is a VM slide).

Figure 10:
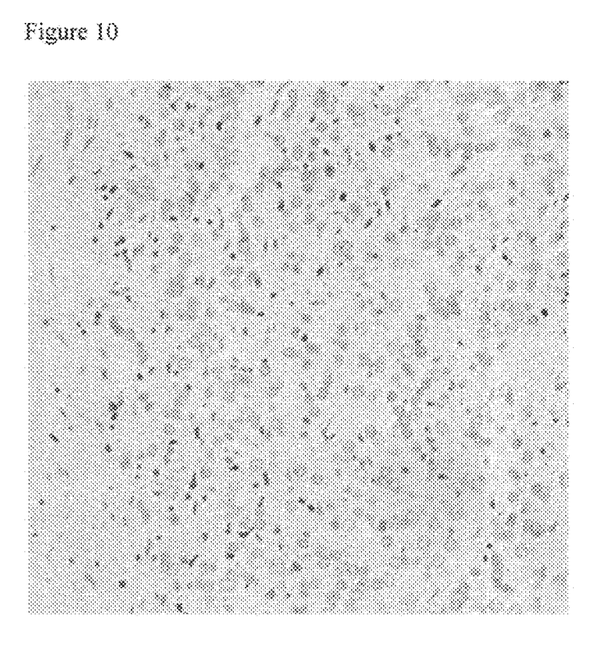
FIGS. 10 and 11 show respectively the images from the same "point" of the image in FIGS. 8 and 9, FIG. 10 being a sampled "point" on the VM Feulgen stain scan image and FIG. 11 on the same point from the VM H and E stain scan image.
Figure 11:
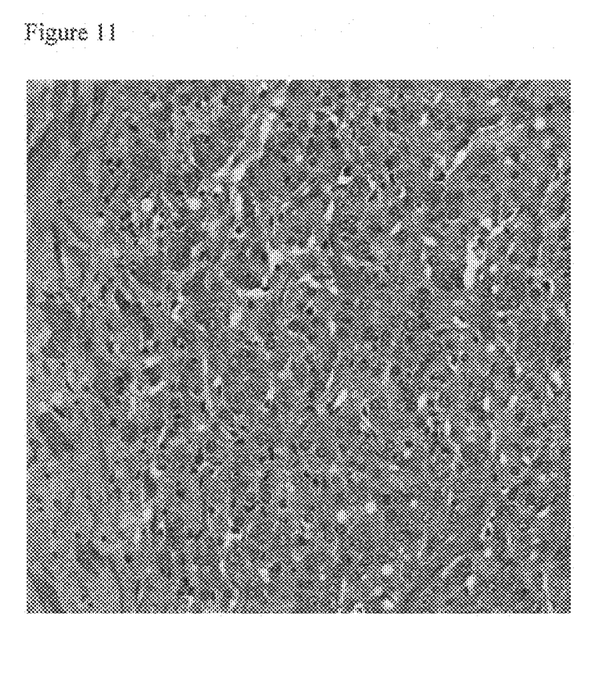

FIGS. 10 and 11 show the images from a relevant sampling point, (one FOV 16) provided by the virtual microscope of FIG. 1, in the case of FIG. 10 with a Feulgen stain and in the case of FIG. 11 with a H and E stain. It is first necessary to align the two images for a particular sampling point, that is, to align the VM images of FIGS. 10 and 11.

In order to do so, it is necessary to process the images of FIGS. 10 and 11 so that they more closely match one another.

As is clear from FIGS. 11, 12, 13 and 14, the image of FIG. 11, is firstly processed by selecting the red channel only. As the image in FIG. 11 is stored in terms of Red, Green Blue signals from the relevant detectors, this can be done by simply deleting the signals from the Green and Blue detectors. This provides the image of FIG. 12. This also provides the first 80% of the grey scale levels (0-205).

The image is then modified by adjusting the contrast (histogram stretching of 0-256). The resulting signal is shown in FIG. 13.

Figure 13:
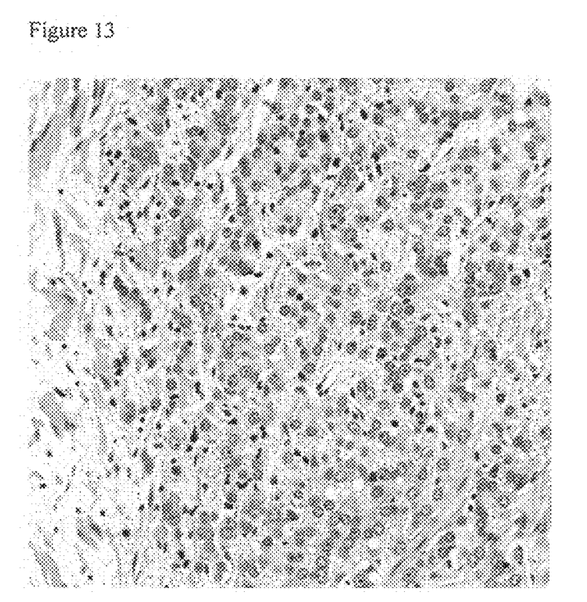
Figure 14:
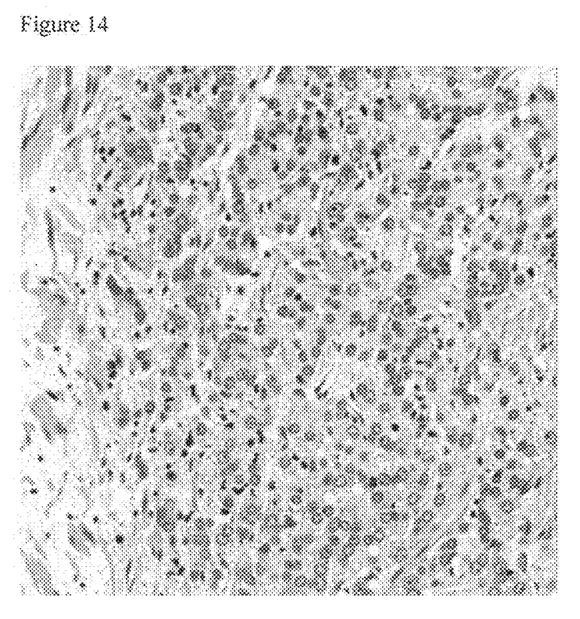

The image of FIG. 13 is then blurred somewhat by averaging the images to provide the image of FIG. 14.

Figure 12:
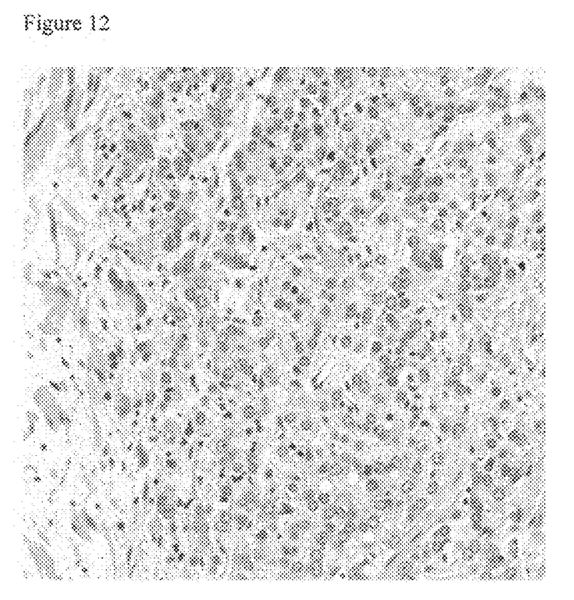
FIGS. 12-14 show the VM H and E stained image of FIG. 11 with successive image processing applied, FIG. 12 showing the image of FIG. 11 wherein only a selected intensity range from (0-204) of the red channel from FIG. 11 is shown, FIG. 13 showing the image of FIG. 12 wherein contrast adjustments are then applied, and FIG. 14, showing the VM H and E stain image of FIG. 13 wherein a blurring is applied to the image.
Figure 15:
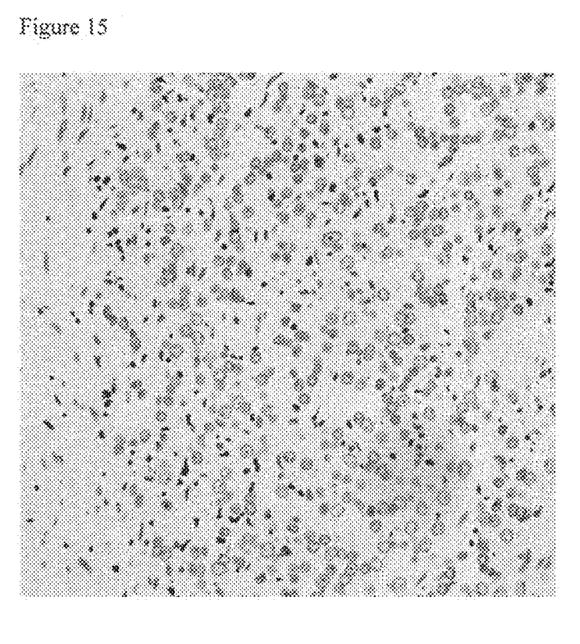
FIG. 15 is the VM Fuelgen stained image of FIG. 9 with contrast adjustment.
Figure 16A:
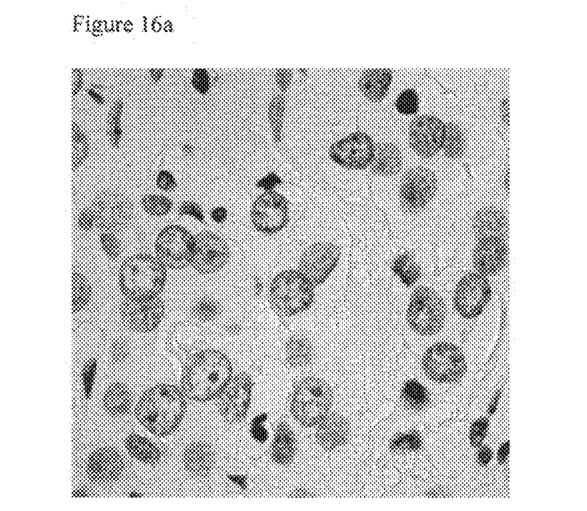
FIGS. 16a and 16b show the two images which are to be aligned, FIG. 16a being a LM Feulgen stained image and FIG. 16b being the VM H and E stained scanned image, FIGS. 17a and 17b correspond to FIGS. 16a and 16b, the LM Feulgen stained image of FIG. 17a having been blurred, and the VM H and E image of FIG. 17b being the H and E virtual microscope image of FIG. 14.
Figure 16B:
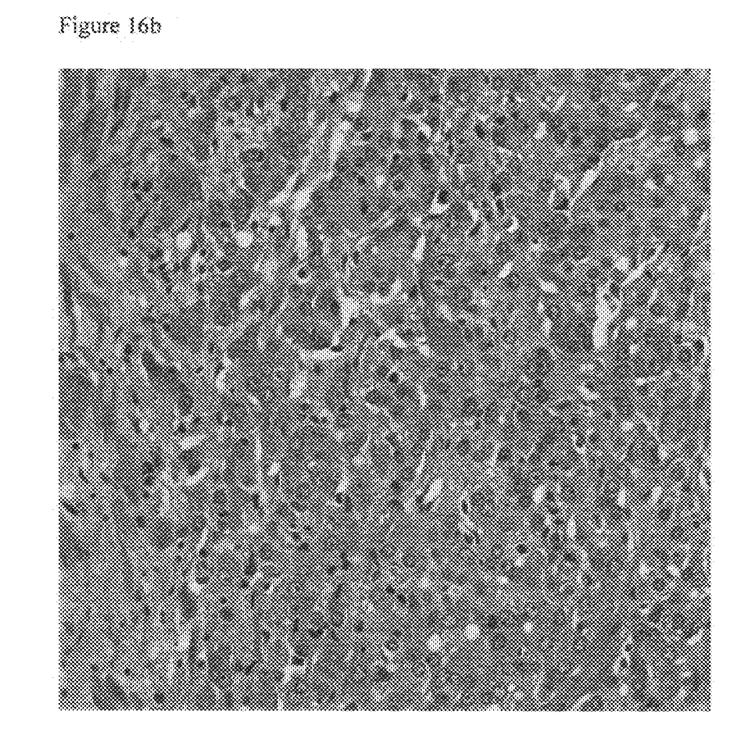

In contrast to the multistep processing of the image of FIG. 11 via FIGS. 12, 13, 14, the image of FIG. 10, that is the Feulgen stained image, simply requires contrast adjustment as shown in FIG. 15.

In this way the two images of FIGS. 10 and 11 (that is the Feulgen stained image and the H and E stained image) have been modified so as to render them of similar appearance in the resultant FIGS. 15 and 14 respectively.

This allows the computer to more readily compare the two images (that is the Feulgen stained image and the H and E stained image).

Figure 18:
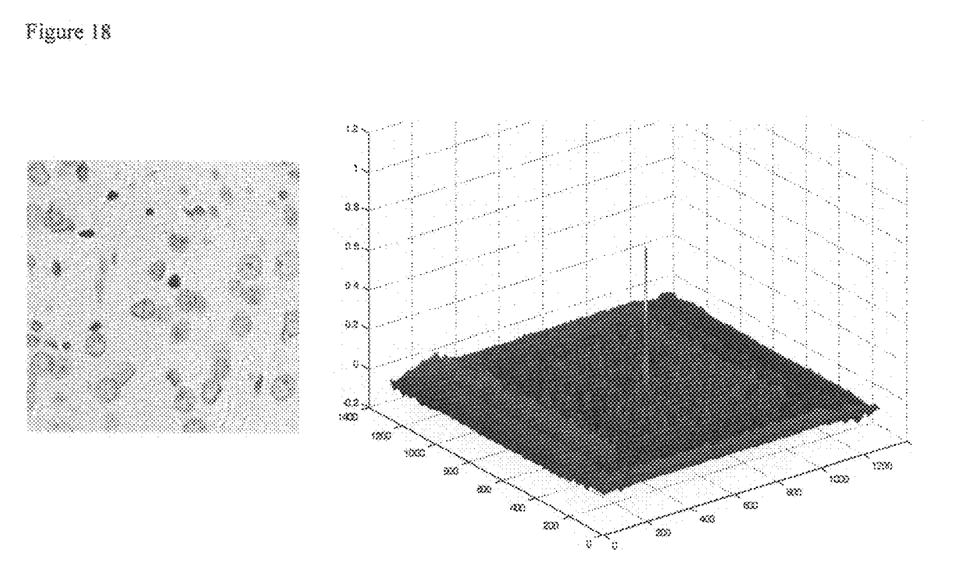
FIG. 18 illustrates the method of aligning the images of FIGS. 14 and 15, that is the VM Feulgen scan image after contrast adjustment, and the VM H and E scan image after blurring.

The way in which the two images of FIGS. 14 and 15 are aligned with one another is shown in FIG. 18. The X and Y axis of the graph is the location spatial distance with respect of one image from the other, the Z axis shows the cross-correlation coefficient, where a high value represents a good match. A central part of the Feulgen stained image of FIG. 15 is successively compared with similarly shaped and sized portions of the H and E stained image of FIG. 14. Effectively one moves, say, a small square of the Feulgen stained image FIG. 15 around the image of FIG. 14, perhaps in a raster scan movement and the normalized cross-correlation of this image is calculated. (Actually, of course, the "movement" and comparison is carried out by software in the computer.) When the selected small piece of the Feulgen stained image is correctly aligned with respect to the H and E same small piece of the stained image, the cross-correlation will provide a peak as is shown in FIG. 18. It can be appreciated that where there is rotational misalignment between the images of FIGS. 14 and 15, the "movement" includes successive cross correlations performed with the small piece of the image in different rotational orientations and the final results will be where the peak is highest in any of the plurality of cross correlation results. In that way the exact correlation of the two scanned maps can be determined.

In this way the exact alignment of FIGS. 10 and 11 is determined.

Figure 17A:
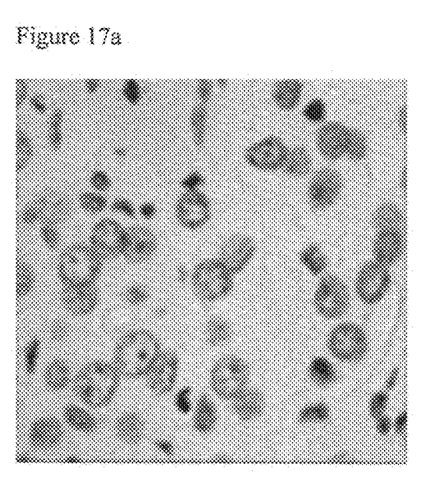
Figure 17B:
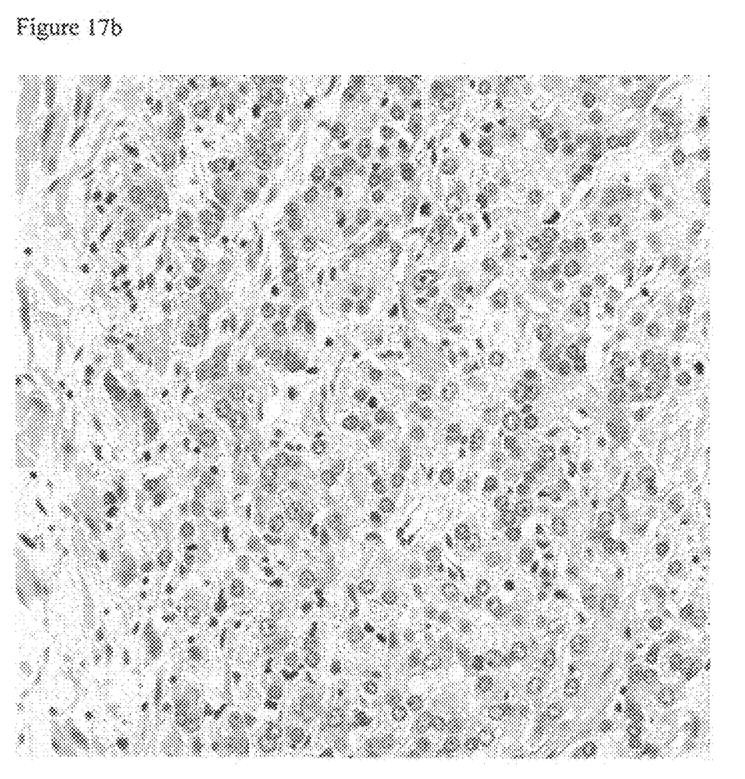
Figure 19:
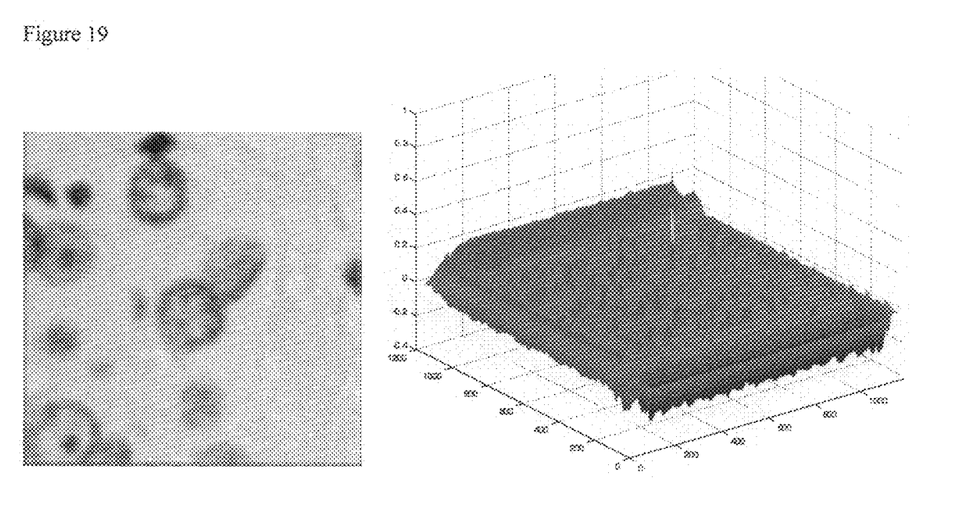
FIG. 19 shows a similar method for alignment of the LM Feulgen stained images to the VM H and E scanned image.

The LM microscope can provide a Feulgen stained image of higher magnification that is illustrated in FIG. 17a. It is now desired to be able to align the image of FIG. 17a with the H and E stained VM image of FIG. 17b (which corresponds to FIG. 14) (in the example given, in fact, FIGS. 14 and 17b are identical images). Clearly it is necessary to (virtually) change the magnification of the image in FIG. 17a to match FIG. 17b and the process to align FIG. 17a and FIG. 17b is carried out in the same way as has already been described with reference to FIG. 18. The effect of this process is shown in FIG. 19 when the position of the relevant LM Feulgen stained microscope image is aligned with the H and E VM image.

We are now, therefore, at a point where we have an alignment of the LM Feulgen stained high resolution image of FIG. 17a with the H and E VM image of FIG. 17b, (via the Feulgen stained H and E image) which enables us to combine the two images as is shown in FIG. 20.

Earlier in the specification we set out the problem for a pathologist to correlate a particular cell identified on the H and E stained image, with a cell on the Feulgen stained image from the light microscope with oil-immersion lens. It will be understood that the above described deals with this problem. In simple terms, the biological sample is firstly viewed through the virtual microscope with H and E staining, the staining is then removed and replaced with Feulgen staining and is examined again through the virtual microscope. A particular part of the H and E stained image is selected, and the relevant parts of the H and E and Feulgen stained images are aligned. A particular part of the Feulgen stained image is examined using the light microscope which enables higher definition of particular cell structure and a correlation is provided between the relevant part of the VM Feulgen stained image and the LM Feulgen stained image so that a particular cell, group of cells or areas which are examined under much higher magnification can be identified. It is then possible to insert these particular areas into the VM H and E image so that the pathologist can be certain that the correct cells have been identified and he is then able to select and view in greater detail a particular cell within that aligned area and associated quantatative information.

So far the description has concentrated on dealing with a single biological specimen on a single slide.

There are circumstances in which two successive slices of a biological specimen are to be acted upon and in this case, for example, one biological sample might be H and E stained, the other Feulgen stained. (We will refer to "successive" slices, but it will be understood that the words include slices which may not be exactly successive but one or a few slices apart so long as they are substantially identical in respect of the images being considered.)

In any case, if a comparison is to be carried out of the two samples, then it is clear that the two samples will not be exactly identical and indeed, in particular, owing to the methods of preparation of the slides, they will not be exactly aligned with one another. One would therefore end up with two images of the two slides which may be misaligned with one another.

Figure 6:
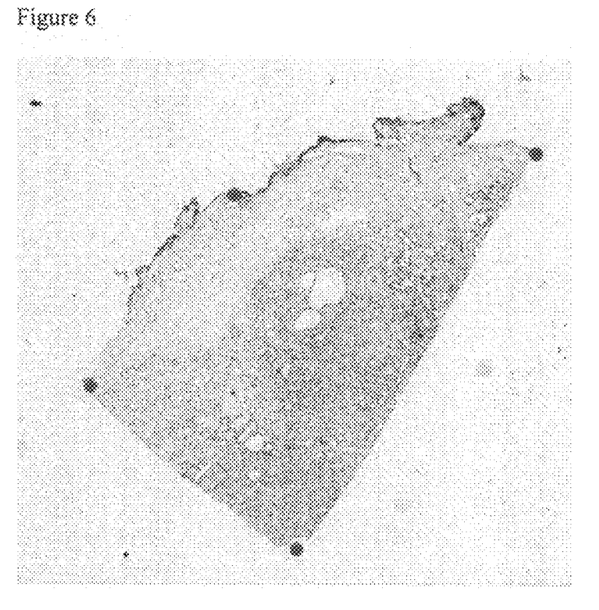
FIG. 6 shows an overview of a Feulgen stained slide.
Figure 7:
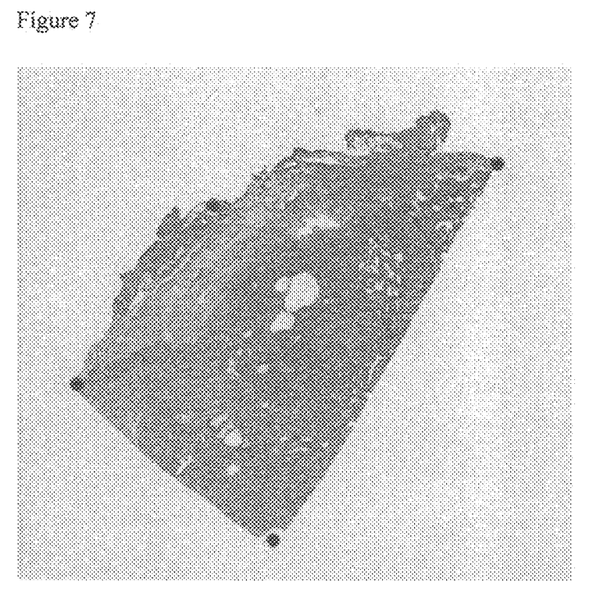
FIG. 7 shows a gray scale representation of an H and E (Haemotoxylin and Eosin stain), stained slide of a corresponding object to FIG. 6, FIGS. 8 and 9 show an image of the object on the microscope slide of FIG. 5, in the case of FIG. 8 the slice is stained with an H and E stain and in the case of FIG. 9 the same slice has the H and E stain removed and a Feulgen stain applied.
Figure 8:
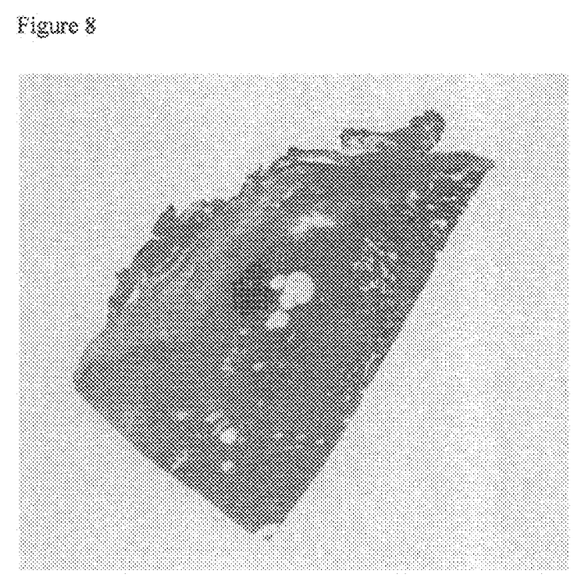

FIGS. 6-8 illustrate how this problem may be dealt with.

FIG. 6 is view of the image of one biological slice and FIG. 7 is a corresponding view of the successive slice.

In order to align them with one another, four points on each image are manually selected, for example, four obvious points might be the four corners or four discontinuities in the outer corners of the slices. The two images then undergo a transformation, for example, an affine transformation, which then maps the relevant points of one image to the corresponding point on the other image. Thus, for example, sampling points correspond to those in FIG. 9 are chosen in one image, for example, image FIG. 6, then corresponding sampling points may be selected on the other image FIG. 7 for exactly corresponding points.

Such a process can also be carried out, in fact, between the two images of FIGS. 9 and 10. As a result of de-staining the H and E stain and applying the Feulgen stain, the microscope slide has to be removed from the VM microscope and re-inserted into the VM microscope. They will not necessarily be aligned exactly as before and so the two images of FIGS. 9 and 10 will be slightly displaced from one another. A similar affine transformation can be used to ensure that the points on one image, FIG. 9, are exactly matched to the same points on FIG. 10.

This specification has been written in terms of aligning microscope images of biological specimens. It is intended to include all of the wide range of stains that can be applied to a specimen for both subjective review and semi-quantitative and quantitative measurement. Clearly other types of microscope images might be aligned and analysed in the same way.

The invention is not restricted to the foregoing examples, particularly with regard to the imaging equipment, example specimens or microscope stains.

The invention claimed is:

1. A method for aligning microscope images comprising:
providing a first image of a subject made up of biological tissue using a first microscope;
providing a second image of the subject using a second microscope which is of a different type and different magnification than the first microscope, wherein the second image is of a selected part of the first image and wherein the first and second images are of the biological tissue stained with different stains;
modifying the two images so that they have a similar appearance to facilitate a comparison of the images; and
aligning the two images.

2. A method as claimed in claim 1 in which the two images are aligned by cross correlation.

3. A method as claimed in claim 1 in which one microscope image is provided by using a Virtual microscope scanner.

4. A method as claimed in claim 1 in which the first image is located in the second image using aligned information to allow quantitative results to be determined.

5. A method as claimed in claim 1 wherein aligning the two images produces a third image wherein first and second images are superimposed in alignment.

6. A method as claimed in claim 1 in which the first and second images show different features of the subject.

7. A method as claimed in claim 6 in which subject is biological tissue and the different features comprise the tissue structure and the cellular structure.

8. A method as claimed in claim 1 in which the subject is not of a biological nature.

9. A method as claimed in claim 6 where the different imaging details is obtained by different lighting methods.

10. A method as claimed in claim 1 in which the subject comprises a slice of biological material.

11. A method as claimed in claim 1 in which the subject comprises a pair of successive slices of biological material, a first slice providing the first image and the second slice providing the second image.

12. A method as claimed in claim 1 in which the first and second images are aligned by selecting a plurality of point on the first and second images and carrying out an affine transformation.

13. A method as claimed in claim 1 in which the first and second images are aligned by selecting a part of the first image and successively comparing it with a similarly shaped and sized parts of the second image translationally and/or rotationally spaced from the first part and from each other, and determining the parts of the first and second images providing the closest cross correlation to thereby align the first and second images.

14. A method as claimed in claim 1 in which the first and second images are processed to provide similar contrast and/or colours for easier comparison.

15. Apparatus for aligning microscope images comprising:
a first microscope for providing a first image of a subject made up of biological tissue;
a second microscope that is of a different type and different magnification than the first microscope for providing a second image of the subject, wherein the second image is of a selected part of the first image and wherein the first and second images are of the biological tissue stained with different stains; and
a computer processing apparatus for modifying the two images so that they have a similar appearance to facilitate a comparison of the images and for aligning.

16. Apparatus as claimed in claim 15 in which the computer processing apparatus includes means to align the two images by cross correlation.

17. Apparatus as claimed in claim 15 in which the computer processing apparatus includes means to successively compare a part of the first image with similarly shaped and sized parts of the second image translationally and/or rotationally spaced from the first part and from each other, and means for determining the parts of the first and second images providing the closest cross correlation to thereby align the first and second images.

18. A method for aligning microscope images comprising:
providing a first image of a subject made up of biological tissue using a first microscope;
selecting at least a portion of said first image;
providing a second image of the selected area using a second microscope which is of a different type and different magnification than the first microscope wherein the first and second images are of the biological tissue stained with different stains;
modifying the two images so that they have a similar appearance to facilitate a comparison of the images; and
aligning the two images.

* * * * *